(12) United States Patent
Chen et al.

(10) Patent No.: US 11,671,937 B2
(45) Date of Patent: Jun. 6, 2023

(54) METHOD FOR DETERMINING POSITION OF BASE STATION AND ASSOCIATED ELECTRONIC DEVICE

(71) Applicant: Wistron NeWeb Corporation, Hsinchu (TW)

(72) Inventors: Szu-Yuan Chen, Hsinchu (TW);
Chiung-Wen Hsin, Hsinchu (TW);
Syu-Hao Chen, Hsinchu (TW);
Chung-Wei Hsu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 123 days.

(21) Appl. No.: 17/232,151

(22) Filed: Apr. 16, 2021

(65) Prior Publication Data
US 2021/0385781 A1    Dec. 9, 2021

(30) Foreign Application Priority Data

Jun. 5, 2020    (TW) .................................. 109118875

(51) Int. Cl.
| | |
|---|---|
| *H04W 24/00* | (2009.01) |
| *H04W 64/00* | (2009.01) |
| *H04W 4/02* | (2018.01) |
| *H04W 36/32* | (2009.01) |
| *H04W 36/30* | (2009.01) |
| *H04W 36/08* | (2009.01) |
| *H04W 76/11* | (2018.01) |

(52) U.S. Cl.
CPC ......... *H04W 64/003* (2013.01); *H04W 4/023* (2013.01); *H04W 36/08* (2013.01); *H04W 36/30* (2013.01); *H04W 36/32* (2013.01); *H04W 76/11* (2018.02)

(58) Field of Classification Search
CPC ... H04W 64/003; H04W 76/11; H04W 4/023; H04W 36/08; H04W 36/30; H04W 36/32
See application file for complete search history.

(56) References Cited

U.S. PATENT DOCUMENTS

| | | | |
|---|---|---|---|
| 2018/0027519 A1* | 1/2018 | Lee ....................... | H04W 24/08 455/456.1 |
| 2020/0107288 A1 | 4/2020 | Kumar | |
| 2022/0094775 A1* | 3/2022 | Suzuki ................... | H01Q 21/28 |

* cited by examiner

*Primary Examiner* — Justin Y Lee
(74) *Attorney, Agent, or Firm* — Winston Hsu

(57) ABSTRACT

An electronic device includes a wireless communication module and a processing circuit. When the processing circuit establishes a link with a base station via the wireless communication module, the processing circuit obtains a beam identified (ID) of a received beam of the wireless communication module, and generates position information based on the beam ID and a beam mapping table. In addition, the processing circuit transmits the position information to an indicator to indicate a position of the base station relative to the electronic device.

10 Claims, 5 Drawing Sheets

(a)　　　　　　　(b)

METHOD FOR DETERMINING POSITION OF BASE STATION AND ASSOCIATED ELECTRONIC DEVICE

BACKGROUND OF THE INVENTION

1. Field of the Invention

The present invention relates to wireless communications, and more particularly, to a method for determining a position of a base station and an associated electronic device.

2. Description of the Prior Art

In the fifth-generation (5G) wireless communication technology, millimeter waves have high transmission loss and high directivity in signal transmission. Therefore, if the Consumer Premise Equipment (CPE) is not aligned with a base station, the signal quality may be seriously degraded. Therefore, to solve this problem, one of the methods is to install the CPE by professionals, such that the CPE can be set to an optimal position for high-quality communication with the base station. However, this method needs professionals to install the equipment, which will cause inconvenience to users. A second method is to detect signal quality such as Received Signal Strength Indication (RSSI), Reference Signal Receiving Power (RSRP), Reference Signal Receiving Quality (RSRQ), etc., and show the signal quality to a user, and the user adjusts a position of the CPE according to the current signal quality. However, the second method is not intuitive, and the user is not able to know specifically where to locate the CPE and consequently just changes the position of the CPE arbitrarily for trying to get an acceptable signal quality of the CPE. Therefore, these methods waste the user's time and cannot make sure that high-quality communication is available.

SUMMARY OF THE INVENTION

One of the objectives of the present invention is to provide a method for determining an installation position of an electronic device and an associated electronic device, which can clearly provide a direction of a base station to a user, thus allowing the user to efficiently adjust the installation position or a direction of a CPE, to solve problems of the prior art.

An embodiment of the present invention discloses an electronic device. The electronic device includes a wireless communication module and a processing circuit. The processing circuit is coupled to the wireless communication module. When the processing circuit establishes a link with a base station via the wireless communication module, the processing circuit obtains a beam identifier (ID) of a received beam of the wireless communication module, and generates position information based on the beam ID and a beam mapping table, the processing circuit transmits the position information to an indicator to indicate a position of the base station relative to the electronic device.

An embodiment of the present invention further discloses a method for determining an installation position of an electronic device. The method includes: controlling the electronic device to establish a link with a base station; obtaining a beam identifier (ID) of a received beam of the electronic device; generating position information based on the beam ID and a beam mapping table; and transmitting the position information to an indicator to indicate a position of the base station relative to the electronic device for being used as the installation position of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
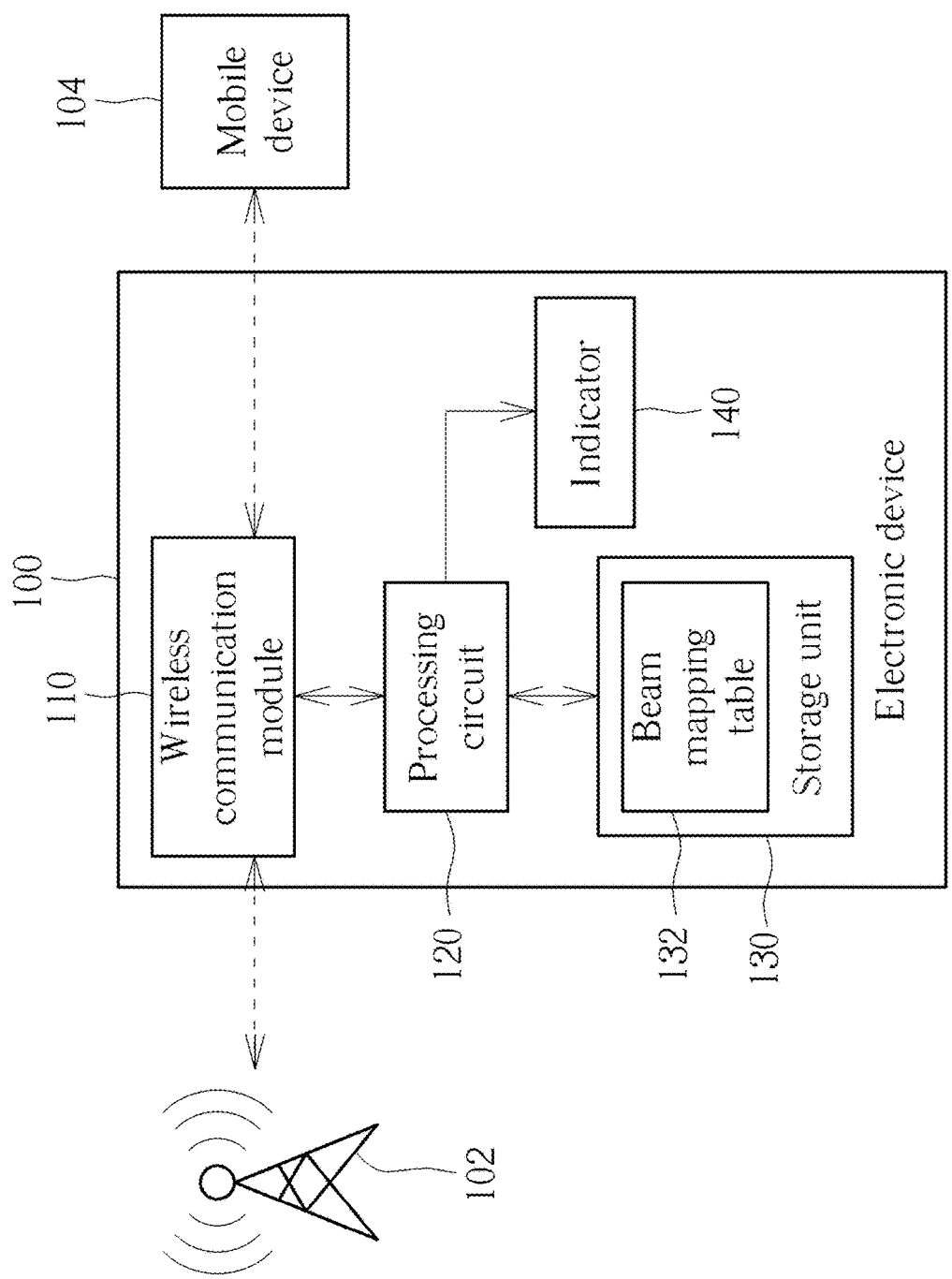
FIG. 1 is a diagram illustrating an electronic device according to an embodiment of the present invention.

FIG. 1 is a diagram illustrating an electronic device 100 according to an embodiment of the present invention. In the present embodiment, the electronic device 100 may be a Consumer Premise Equipment (CPE) conforming to the fifth-generation wireless communication technology. The electronic device 100 can be regarded as a relay station between a base station 102 and another electronic device (e.g., a mobile device 104). The electronic device 100 includes a wireless communication module 110, a processing circuit 120, a storage unit 130 and an indicator 140, wherein a beam mapping table is stored in the storage unit 130.

Figure 2:
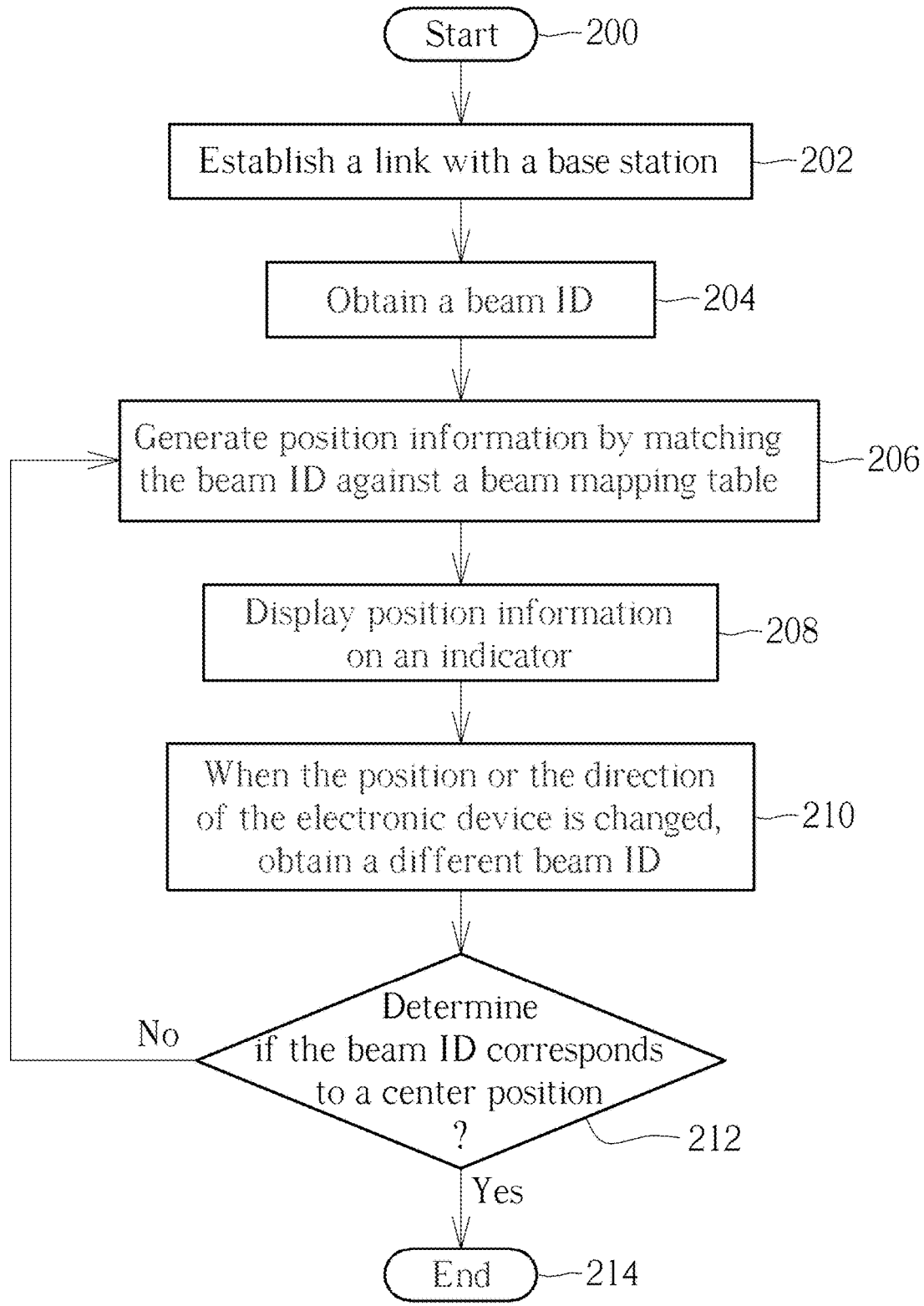
FIG. 2 is a flowchart illustrating a method for detecting an installation position of the electronic device according to an embodiment of the present invention.

The electronic device 100 is a CPE conforming to the fifth-generation wireless communication technology. Therefore, considering that millimeter waves have high transmission loss and high directivity in signal transmission, the electronic device 100 may detect a position/direction of the base station 102 relative to the electronic device 100 in real time, and may use indicator 140 to show how to move or rotate the electronic device 100 for enabling the electronic device 100 to receive a signal with best quality from the base station 102. FIG. 2 is a flowchart illustrating a method for detecting an installation position of the electronic device 100 according to an embodiment of the present invention. In step 200, the flow starts, and the electronic device 100 is powered on. In step 202, due to the weak penetration ability of millimeter waves, the user can put the electronic device 100 on a place near a window without any blocking object nearby to facilitate link establishment between electronic device 100 and base station 102. That is to say, the processing circuit 120 establishes a link with the base station 102 through the wireless communication module 110, and starts to communicate with the base station 102. In step 204, the processing circuit 120 obtains a beam identifier (ID) of the electronic device 100. For example, the electronic device 100 stores a beam ID mapping table, wherein the beam ID mapping table can be also known as a codebook that is configured to store information of each beam ID (e.g., antenna array combination, strength and phase information, etc.), and the processing circuit 120 may refer to the signal transmitted from the base station 102 to identify a beam ID of the received beam of the wireless communication module 110 from the beam ID mapping table. In the present embodiment, before the base station 102 and the electronic device 100 start data transmission, the wireless communication module 110 receives a plurality of signals from the base station 102, and the wireless communication module 110 and the processing circuit 120 both use a predetermined selection mechanism to select one from the plurality of beams. For example, the quality of the plurality of beams is determined, and the beam having the best signal quality is selected as a receive/transmit beam (single beam) of the wireless communication module 110 for subsequent data transmission. In addition, since determining the received beam of the wireless communication module 110 and determining the beam ID of the received beam is known to those skilled in the art, further description is omitted here for simplicity.

Figure 3:
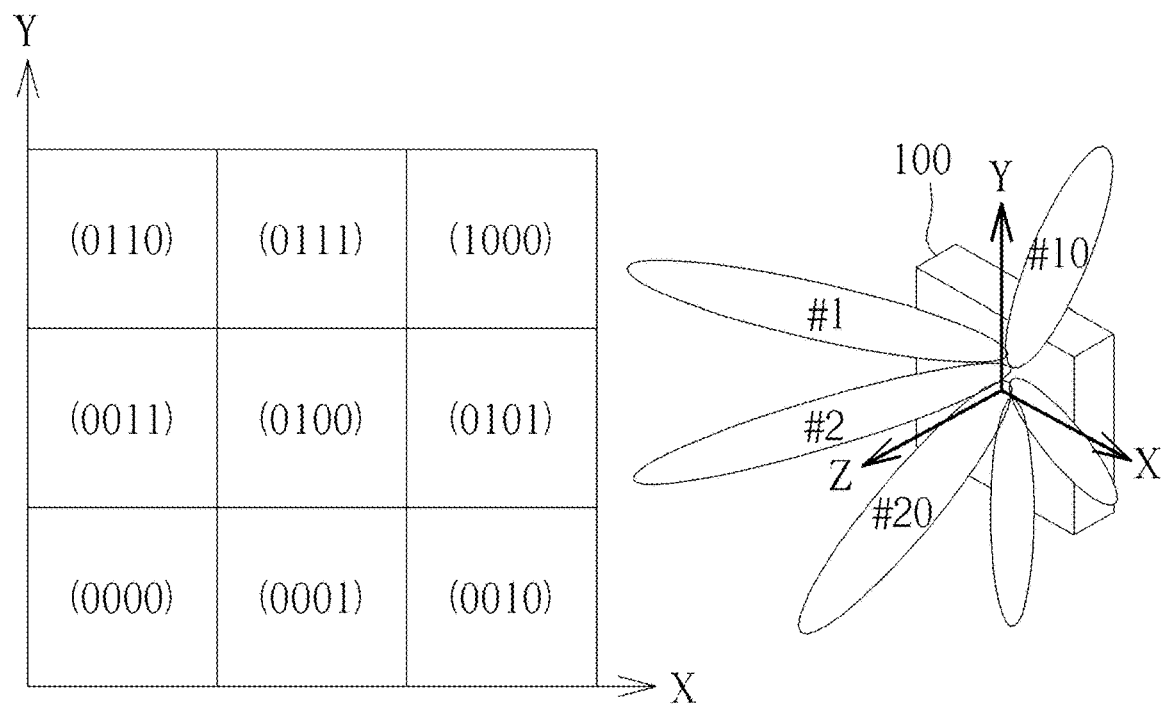
FIG. 3 is a diagram illustrating a plurality of beam IDs and an X-Y plane being divided into a plurality of spatial blocks.

In step 206, the processing circuit 120 lookups an entry in the beam mapping table 132 by matching against the beam ID, and generates position information obtained from the beam mapping table 132, wherein the position information may be a position/direction of the base station 102 relative to the electronic device 100. Specifically, referring to FIG. 3 and a Table 1 below which is configured to describe the beam mapping table 132, the beam mapping table 132 includes a plurality of beam IDs and corresponding spatial blocks. In an embodiment, the beam mapping table 132 can also include a plurality of beam IDs and corresponding signal strengths. As shown in FIG. 3, assuming that a shape of the electronic device 100 is similar to a cuboid and a front surface thereof (the main signal receiving surface) is an X-Y plane, a designer of the electronic device 100 may divide the X-Y plane into multiple spatial blocks located at different positions or in different spatial coordinate ranges, such as nine spatial blocks having position information "0110", "0111", "1000", "0011", "0100", "0101", "0000", "0001", "0010", respectively. In the present embodiment, assuming that the electronic device 100 currently receives the signal from the base station 102 through a beam with a beam ID "#1", it can be known that the corresponding spatial block is "0011" on the left. In other words, the base station 102 is located on the right of the electronic device 100. In addition, assuming that the processing circuit 120 determines the beam of the electronic device 100 receiving the signal having a beam ID "#2", it can be known that the corresponding spatial block is "0100" in the front. In other words, the base station 102 is located in front of the electronic device 100.

TABLE 1

| Beam ID | Spatial block | Signal strength |
|---|---|---|
| #1 | 0011 | 50 |
| #2 | 0100 | 100 |
| #3 | 0111 | 30 |
| #4 | 1000 | 40 |
| #5 | 0000 | 70 |
| . . . | . . . | . . . |
| #100 | 0010 | 80 |

It should be noted that the beam ID, corresponding positions and the plurality of spatial blocks divided from the X-Y plane shown in Table 1 and FIG. 3 are for illustrative purposes only, and the present invention is not limited thereto.

Figure 4:
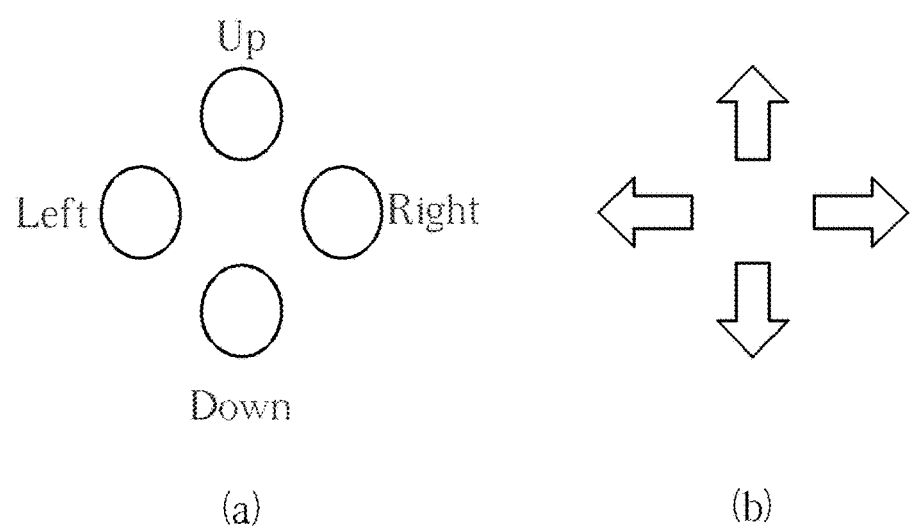
FIG. 4 is a diagram illustrating an indicator.

In step 208, the processing circuit 120 refers to the position information determined in step 206 for controlling the indicator 140 to indicate a position of the base station 102 relative to the electronic device 100. Specifically, please refer to the indicator 140 shown in FIG. 4, wherein FIG. 4(a) and FIG. 4(b) illustrate four indicator keys (indicator symbols) represent four directions, such as up, down, left and right, respectively. Each indicator key may include a light-emitting component, and may be arranged on a housing of the electronic device 100 to indicate a direction of the base station 102. Take FIG. 3 as an example. Assuming that the beam ID is "#1" and the position information is "0011", the left indicator key of the indicator 140 can emit light. In another embodiment, the function of the indicator 140 can be integrated in an application of the mobile device 104. That is to say, the processing circuit 120 transmits the position information to the mobile device 104 through the wireless communication module 110, and the mobile device 104 displays it.

Figure 5:
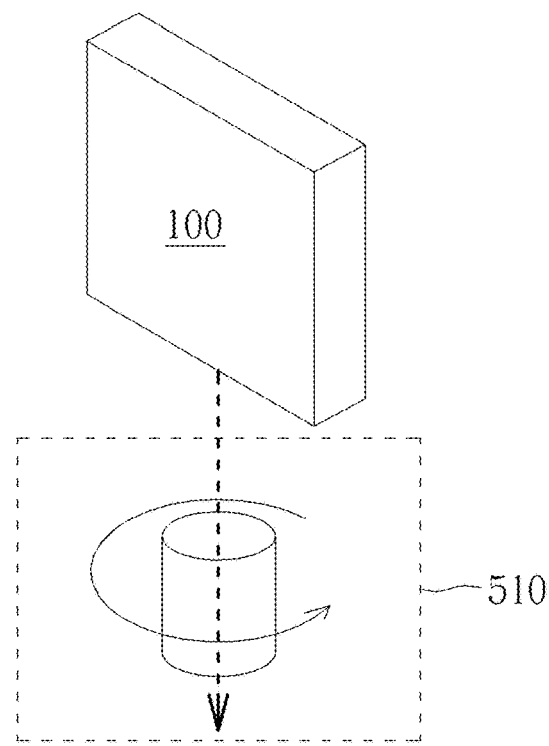
FIG. 5 is a diagram illustrating a rotating bracket being used to adjust a position/direction of the electronic device.
Figure 6:
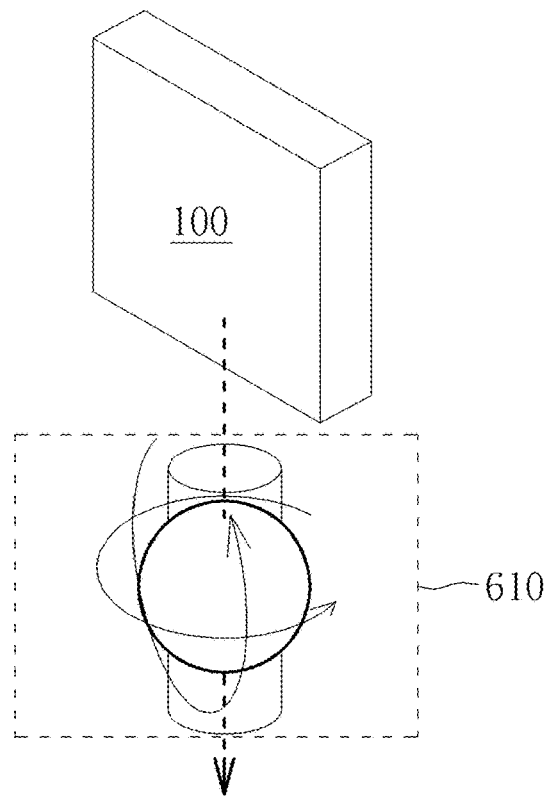
FIG. 6 is a diagram illustrating a spherical rotating bracket being used to adjust a position/direction of the electronic device.

In step 210, the indicator 140 indicates the position or the direction for moving/rotating the electronic device 100. When a user changes the position or the direction of the electronic device 100, the electronic device 100 obtains a different beam ID. Specifically, as shown in FIG. 5, the electronic device 100 can be arranged on a rotating bracket 510 and can be rotated according to the position information displayed by the indicator 140, wherein the rotating bracket 510 is a horizontal rotating bracket that allows the electronic device 100 to be rotated leftward (counterclockwise) or rightward (clockwise). In addition, as shown in FIG. 6, the electronic device 100 can be arranged on a spherical rotating bracket 610 and can be allowed to rotate in any direction according to the position information displayed by the indicator 140.

In step 212, the processing circuit 120 determines if the beam ID that is obtained after rotation of the electronic device 100 corresponds to a center position. In the present embodiment, the processing circuit 120 may determine if the beam ID that is obtained after rotation of the electronic device 100 is a specific beam ID which corresponds to the center position, and/or may determine if the corresponding spatial block is a specific spatial block which corresponds to the center position. If No, the flow proceeds with step 206; if Yes, the flow proceeds with Step 214. In the present embodiment, referring to FIG. 3 and the above beam mapping table 132 (Table 1), the beam ID "#2" corresponding to the center position (i.e., a position in the front) information "0100" has best signal quality. Therefore, the aforementioned specific beam ID may be beam ID "#2", and the specific spatial block may be the spatial block having position information "0100". In other words, if the beam ID of the beam for receiving signal obtained after rotation of the electronic device 100 is not beam ID "#2", the flow proceeds with step 206 to re-instruct the user to rotate the electronic device 100 until the beam for receiving signal of the electronic device 100 has beam ID "#2". That is to say, the base station 102 is roughly located in front of the electronic device 100 at this time.

In step 214, the electronic device 100 receives the signal from the base station 102 through the beam having the beam ID "#2" at this time, and the base station 102 is roughly located in front of the electronic device 100. Therefore, the electronic device 100 has been located at a best or a better position or direction, such that the processing circuit 120 may notify the user through other indicators that the electronic device 100 does not need to be rotated. The user can also lock the rotating bracket 510 or the spherical rotating bracket 610 to fix the position and direction of the electronic device 100 at this time.

On the other hand, in step 206, if the position information generated from the processing circuit 120 by matching the beam ID against the beam mapping table 132 is "0100", that is, the electronic device 100 has been located at a best or a better position or direction, the flow proceeds with step 214 directly, and the indicator 140 or the other indicators may notify the user that the electronic device 100 does not need to be rotated.

It should be noted that, in the above embodiment of step 212, the processing circuit 120 continually generates the position information to the indicator 140 for requesting the user to adjust the position or direction of the electronic device 100 until the electronic device 100 receives the signal from the base station 102 through the beam having the beam ID "#2". However, the present invention is not limited thereto. In other embodiments, when the processing circuit 120 receives a signal transmitted from the base station 102 and the quality of the signal meets a criterion (e.g., the signal quality corresponding to the beam ID of the beam used by the electronic device 100 for receiving the signal (as shown in Table 1) is greater than a threshold value), the flow proceeds with step 214 to end the indication of the position information of the base station 102. These alternative designs all belong to the scope of the present invention.

Figure 7:
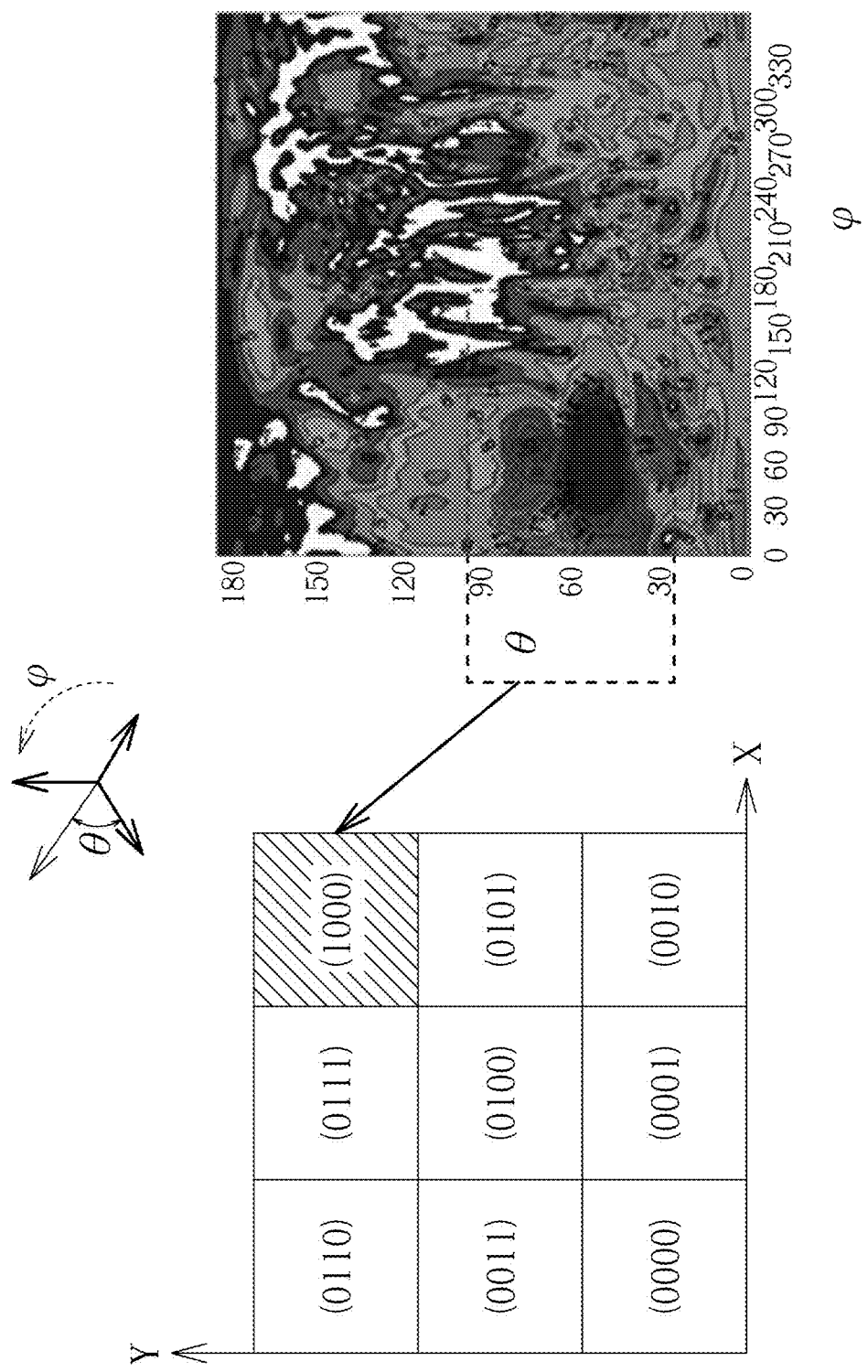
FIG. 7 is a diagram illustrating determination of position information corresponding to a beam ID according to an embodiment of the present invention.

On the other hand, the aforementioned beam mapping table 132 is measured in a laboratory or factory to record position information and signal strength of each beam ID. Take FIG. 7 as an example. An antenna pattern plot on the right side of FIG. 7 plots measured signal strength of the beam ID "#6" in different positions and directions, wherein the antenna pattern plot includes a rotating angle $\varphi$ from X-axis to Y-axis and a rotating angle $\theta$ from Z-axis to X-axis/Y-axis. An engineer may determine the corresponding position information (e.g. a spatial block) according to a hot zone in the antenna pattern plot (i.e., the area with a strongest signal shown in a dotted frame). In the embodiment of FIG. 7, the hot zone of the antenna pattern plot is approximately located in the area where the rotating angle $\varphi$ is 60 degrees and the rotating angle $\theta$ is 60 degrees. Therefore, the hot zone can be mapped to a spatial block having the position information "1000" on the X-Y plane. According to the above description, the engineer may establish information of each beam ID in the beam mapping table 132 through the above method.

Summarizing the present invention briefly, in the method and electronic device for determining the position of a base station of the present invention, a current position of electronic device relative to the base station can be determined through a pre-established beam mapping table, and an indicator can inform a user of a position adjusting direction of the electronic device. In this way, the electronic device can be easily and efficiently installed by the user without any help from professionals, so as to improve the convenience of the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a wireless communication module; and
a processing circuit, coupled to the wireless communication module;
wherein when the processing circuit establishes a link with a base station via the wireless communication module, the processing circuit obtains a beam identifier (ID) of a received beam of the wireless communication module, and generates position information based on the beam ID and a beam mapping table, the processing circuit transmits the position information to an indicator to indicate a position of the base station relative to the electronic device;
wherein the beam mapping table records a plurality of beam IDs and a plurality of position information corresponding to the plurality of beam IDs, respectively, and each of the plurality of position information corresponds to a spatial block or a spatial coordinate range indicating a location on a front surface of the electronic device.

2. The electronic device of claim 1, wherein the electronic device is arranged on a rotating bracket and is rotated according to the position information; when the electronic device is rotated and the processing circuit receives another beam ID of another received beam of the wireless communication module, the processing circuit further generates another position information based on the another beam ID and the beam mapping table; and the processing circuit further transmits the another position information to the indicator to indicate a position of the base station relative to the electronic device.

3. The electronic device of claim 2, wherein whenever the electronic device is rotated and the processing circuit receives a different beam ID of a different received beam of the wireless communication module, the processing circuit generates corresponding position information to the indicator until the processing circuit receives a specific beam ID.

4. The electronic device of claim 2, wherein whenever the electronic device is rotated and the processing circuit receives a different beam ID, the processing circuit generates corresponding position information to the indicator until quality of a signal transmitted from the base station and received by the processing circuit meets a criterion.

5. The electronic device of claim 1, wherein the indicator is located on a housing of the electronic device, and the indicator comprises a plurality of direction indicator symbols for indicating the position information.

6. The electronic device of claim 1, wherein the electronic device is a Consumer Premise Equipment (CPE) conforming to the fifth-generation wireless communication technology.

7. A method for determining an installation position of an electronic device by a processing circuit, comprising:
controlling the electronic device to establish a link with a base station;
obtaining a beam identifier (ID) of a received beam of the electronic device;
generating position information based on the beam ID and a beam mapping table; and
transmitting the position information to an indicator to indicate a position of the base station relative to the electronic device for being used as the installation position of the electronic device;
and further comprising:
(a) obtaining another beam ID of another received beam of the electronic device;

(b) generating another position information based on the another beam ID and the beam mapping table;
(c) transmitting the another position information to the indicator to indicate a position of the base station relative to the electronic device; and
(d) repeating steps (a) to (c) until a specific beam ID of the received beam of the electronic device is received or until quality of a signal transmitted from the base station meets a criterion.

8. The method of claim 7, wherein the beam mapping table records a plurality of beam IDs and a plurality of position information corresponding to the plurality of beam IDs, respectively, and each of the plurality of position information corresponds to a spatial block or a spatial coordinate range.

9. The method of claim 7, wherein the indicator is located on a housing of the electronic device, and the indicator comprises a plurality of direction indicator symbols for indicating the position information.

10. The method of claim 7, wherein the electronic device is a Consumer Premise Equipment (CPE) conforming to the fifth-generation wireless communication technology.

* * * * *